United States Patent [19]
Anderson et al.

[11] Patent Number: 6,119,665
[45] Date of Patent: Sep. 19, 2000

[54] MODULAR AIR INTAKE HEATER

[75] Inventors: Chadwick P. Anderson, Golden Valley; Jan P. Thimmesch, Eden Prairie, both of Minn.

[73] Assignee: Philips & Temro Industries Inc., Eden Prairie, Minn.

[21] Appl. No.: 09/109,586

[22] Filed: Jul. 2, 1998

Related U.S. Application Data

[63] Continuation-in-part of application No. 09/060,808, Apr. 15, 1998.

[51] Int. Cl.$^7$ ...................................................... F02G 5/00
[52] U.S. Cl. ............................................ 123/549; 219/206
[58] Field of Search ................................. 123/549, 556; 219/206, 207

[56] References Cited

U.S. PATENT DOCUMENTS

| | | |
|---|---|---|
| 909,898 | 1/1909 | Hertzberg et al. . |
| 1,068,322 | 7/1913 | Church et al. . |
| 1,136,845 | 4/1915 | Tate . |
| 1,369,551 | 2/1921 | Schmid . |
| 1,456,018 | 5/1923 | Wiegand . |
| 1,724,481 | 8/1929 | Heginbottom et al. . |
| 1,931,379 | 10/1933 | Graziano . |
| 1,931,837 | 10/1933 | Belanger . |
| 2,115,634 | 4/1938 | Kiesel . |
| 2,177,840 | 10/1939 | Roualet . |
| 2,668,900 | 2/1954 | Kwartz . |
| 3,088,447 | 5/1963 | Henderson . |
| 3,492,457 | 1/1970 | Subt . |
| 3,625,190 | 12/1971 | Boissevain . |
| 3,892,215 | 7/1975 | Hickling et al. . |
| 3,912,903 | 10/1975 | Northrup, Jr. et al. . |
| 4,020,812 | 5/1977 | Hayward . |
| 4,082,030 | 4/1978 | Erickson ................................. 411/913 |
| 4,106,454 | 8/1978 | Henlis . |
| 4,108,125 | 8/1978 | Marcoux et al. . |
| 4,363,958 | 12/1982 | Kobayashi et al. . |
| 4,395,994 | 8/1983 | Goto et al. . |
| 4,463,721 | 8/1984 | Hayashi et al. . |
| 4,501,255 | 2/1985 | Van Der Ploeg et al. . |
| 4,651,702 | 3/1987 | Nara et al. . |
| 4,667,645 | 5/1987 | Gluckman . |
| 4,685,437 | 8/1987 | Tanaka et al. . |
| 4,870,249 | 9/1989 | Kayanuma et al. . |
| 4,944,260 | 7/1990 | Shea et al. . |
| 5,595,164 | 1/1997 | Thimmesch . |
| 5,666,804 | 9/1997 | Sekiya et al. . |
| 5,743,242 | 4/1998 | Thimmesch . |

FOREIGN PATENT DOCUMENTS

| | | |
|---|---|---|
| 648536 | 12/1928 | France . |
| 771774 | 4/1934 | France . |
| 867019 | 9/1941 | France . |
| 4410820 | 10/1994 | Germany . |
| 62-91649 | 4/1987 | Japan . |
| 194009 | 3/1923 | United Kingdom . |
| 667509 | 3/1952 | United Kingdom . |
| 2067245 | 7/1981 | United Kingdom . |

*Primary Examiner*—Noah P. Kamen
*Attorney, Agent, or Firm*—Harness, Dickey & Pierce, P.L.C.

[57] ABSTRACT

A modular intake heater for an internal combustion engine. The heater includes a first holder, a second holder, a heating element positioned between the first and second holders, and a retainer mechanism coupling the first holder to the second holder to retain the heating element therebetween. In alternative embodiments of the invention the retainer mechanism includes a clip mechanism and a grommet lockingly engaging a bolt disposed within passages defined by the first and second holders.

23 Claims, 5 Drawing Sheets

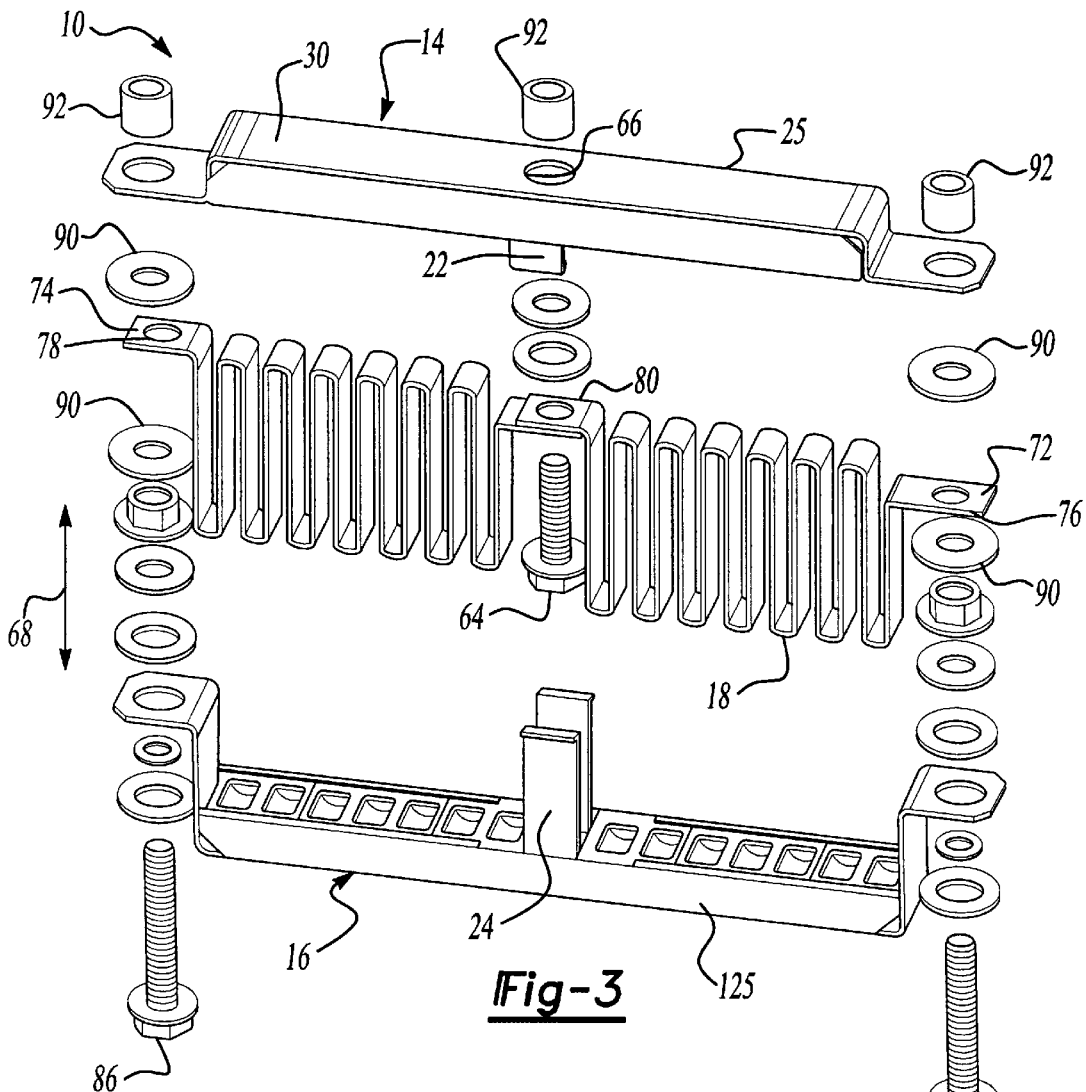
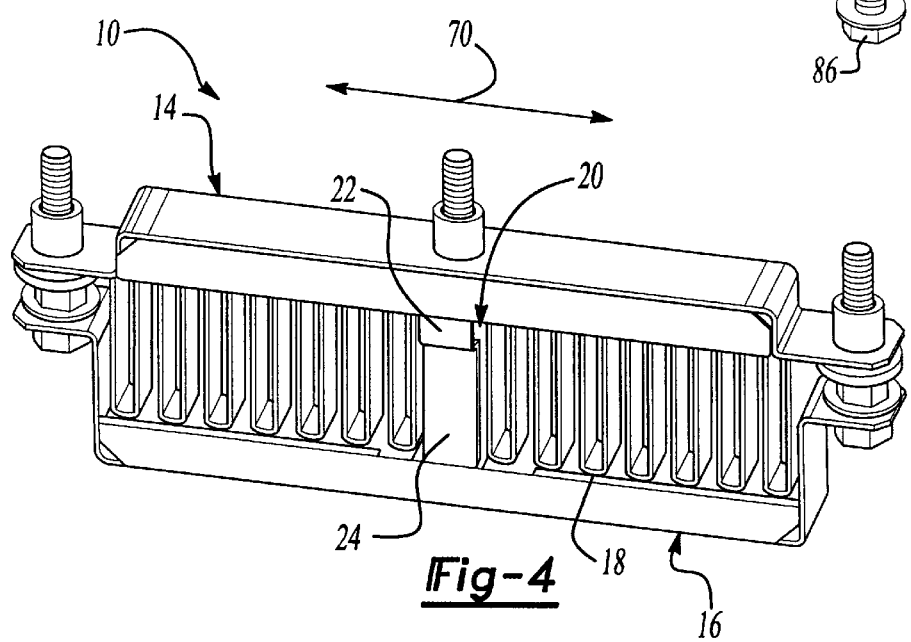

MODULAR AIR INTAKE HEATER

This is a continuation-in-part of U.S. patent application Ser. No. 09/060,808, filed Apr. 15, 1998.

BACKGROUND OF THE INVENTION

1. Technical Field

This invention generally relates to an apparatus for heating the air/fuel mixture entering the cylinders of an internal combustion engine. More particularly, the invention relates to a modular electric heater adapted for mounting within an intake passage of the engine.

2. Discussion

The air/fuel mixture entering the cylinders of an internal combustion engine is commonly heated to increase fuel economy and responsiveness to starting as well as to decrease pollutant discharge. One type of intake heating device generally includes a pair of gaskets surrounding a heating coil or grid disposed between the carburetor and the air intake manifold as shown in U.S. Pat. No. 4,020,812 to Hayward and U.S. Pat. No. 4,106,454 to Henlis. The gaskets in these devices prevent air leaks into and out of the engine manifold and thermally and electrically isolate the grid from the intake structure. However, as recognized and addressed in U.S. Pat. No. 5,595,164 ("the '164 Patent"), entitled "Low Profile Intake Manifold Heater", issued Jan. 21, 1997, gasket wear or aging may eventually short the electric circuit through the heating element.

While the heater of the '164 Patent addresses the short circuiting concerns, it uses a large mounting structure that supports the heating element within the manifold. This mounting structure is expensive to ship to customers, cumbersome to work with, and requires external gaskets to seal against the manifold. In addition to the manufacturing and shipping costs associated with the mounting structure, the requisite gaskets increase the overall joint thickness and the difficulty of constructing a joint that will both seal and provide structural support to the intake system.

In view of the above concerns as well as manufacturers' ever present desire to reduce manufacturing costs and complexity, a need exists for a modular heater device that may be easily and inexpensively manufactured, shipped, and installed in a variety of applications.

SUMMARY OF THE INVENTION

The present invention addresses the above identified needs by providing a modular air intake heater that includes a first holder, a second holder, a heating element coupled to the first holder and the second holder, a biasing element, and a retainer mechanism coupling the first and second holders against the urging of the biasing element. The modular heater includes a mounting assembly that facilitates use of the heater in a variety of different housings, manifolds or ducts thereby reducing the need to inventory multiple heater configurations. Many manufacturers place a high value on reducing the total number of different components they are required to maintain in inventory. Product interchangeability decreases the physical amount of space required to store components and lessens the documentation burden of tracking similar components throughout the engineering and assembly process. The mounting assembly of the modular heater reduces the overall size of the heater while the retainer mechanism maintains the heater components in a structurally secure configuration for transportation and installation.

In addition, the mounting assembly and overall heater configuration eliminates the need for additional sealing members such as gaskets within the joint connecting the intake to the engine. By removing any gaskets or flange type housings for mounting the heater element, the joint integrity and cost of the assembly is positively affected.

BRIEF DESCRIPTION OF THE DRAWINGS

The various advantages of the present invention will become apparent to one skilled in the art by reading the following specification and appended claims, and by referencing the following drawings in which:

FIG. 3 is an exploded perspective view of a first embodiment of the modular air intake heater;

FIG. 4 is a perspective view of the modular heater device shown in FIG. 3 assembled for shipment;

DETAILED DESCRIPTION OF THE PREFERRED EMBODIMENTS

Figure 1:
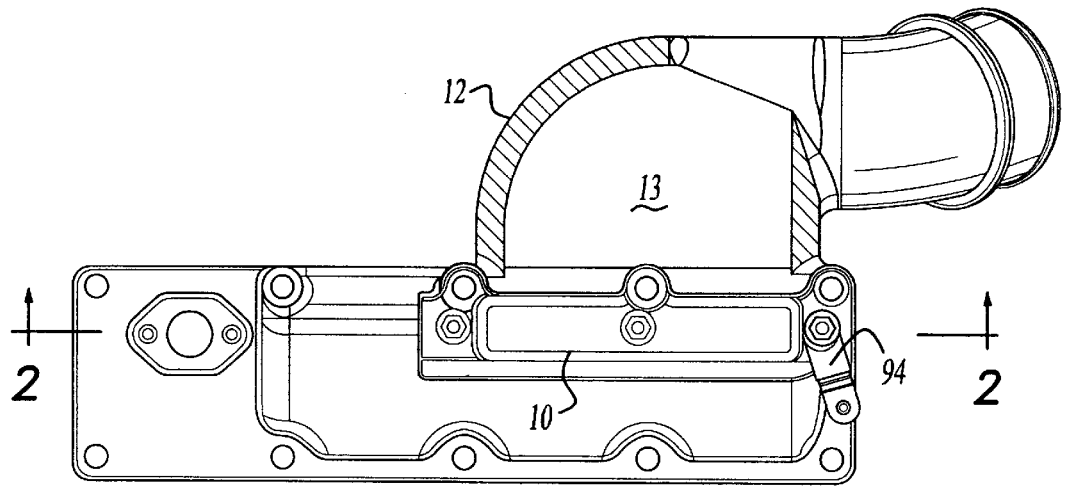
FIG. 1 is a top view of the modular heater assembled and mounted to an intake manifold of an internal combustion engine.
Figure 2:
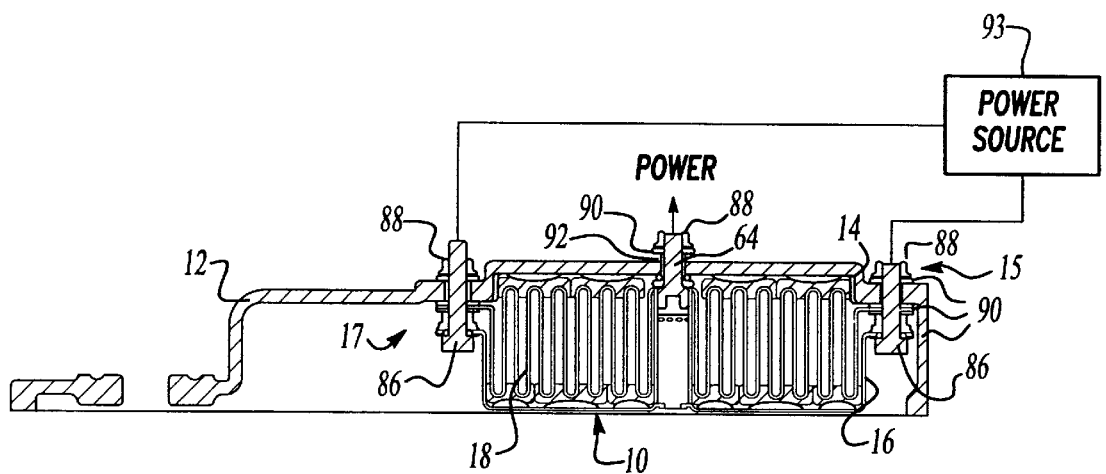
FIG. 2 is a sectional view taken at location 2—2 shown in FIG. 1 and illustrating the attachment of the heater device to the intake manifold.

With reference to FIGS. 1 and 2, a first embodiment of the modular air intake heater 10 of the present invention is connectable to an intake 12 of an internal combustion engine in communication with a passage 13 (FIG. 1) of intake 12. As will be described in greater detail hereinafter, a coupling assembly 15 (FIG. 2) couples the heater 10 to the intake 12 at predetermined discrete points. The coupling assembly is electrically and thermally isolated from the intake in a manner generally known in the art.

As best illustrated in FIGS. 2–4, heater 10 includes a first holder 14, a second holder 16, and a serpentine heater element 18. FIGS. 2–6 depict a first embodiment of a retainer mechanism 20 coupling first holder 14 to second holder 16 against the biasing force of a biasing element such as wave springs 34 and 134 shown in FIGS. 5 and 6, respectively. Retainer mechanism 20 (FIG. 4) couples first and second holders 14 and 16 to each other against the biasing force of a biasing element such as wave springs 34 and 134 shown in FIGS. 5 and 6, respectively, and described in detail hereinafter.

With reference to FIGS. 3 and 4, retainer mechanism 20 includes a first set of clip tabs 22 and a second clip tab 24. Second clip tab 24 is configured to engage first set of clip tabs 22 (FIG. 5) in a snap-fit coupling that is also described in detail below. The snap-fit coupling securely retains heater element 18 between first and second holders 14 and 16 as shown in FIG. 4. The structural configuration of modular heater 10 provides numerous advantages over the prior art including ease of shipment as the heater is modular in the sense that it does not require a large or complex mounting frame to securely intercouple the heater elements for shipment nor to secure the modular heater to the engine for operation. Additionally, the retainer mechanism 20 of the present invention withstands the harsh temperature and vibrational environment within an internal combustion engine.

Figure 5:
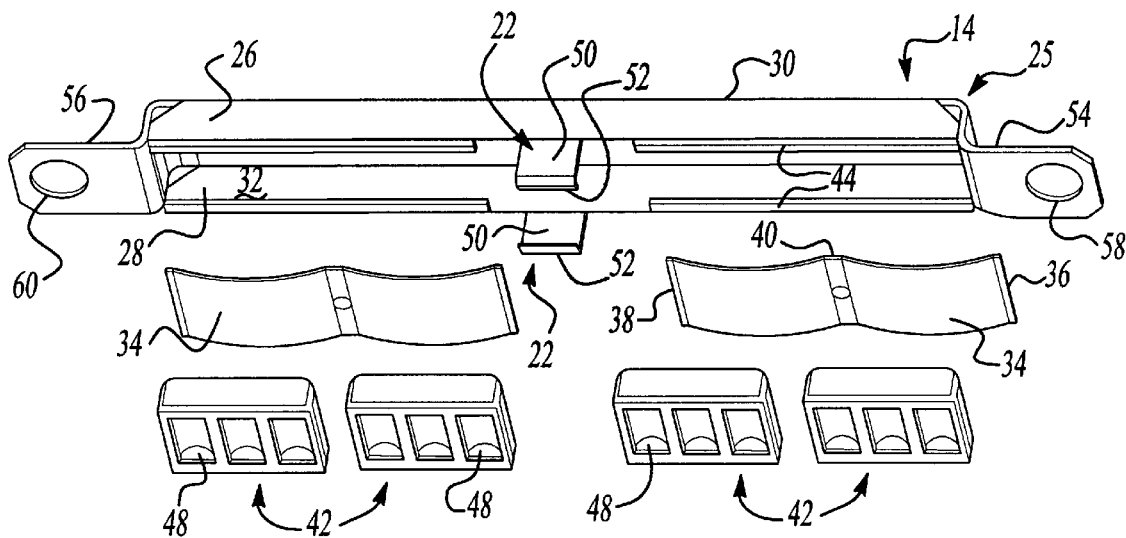
FIG. 5 is an exploded view of the first holder.
Figure 6:
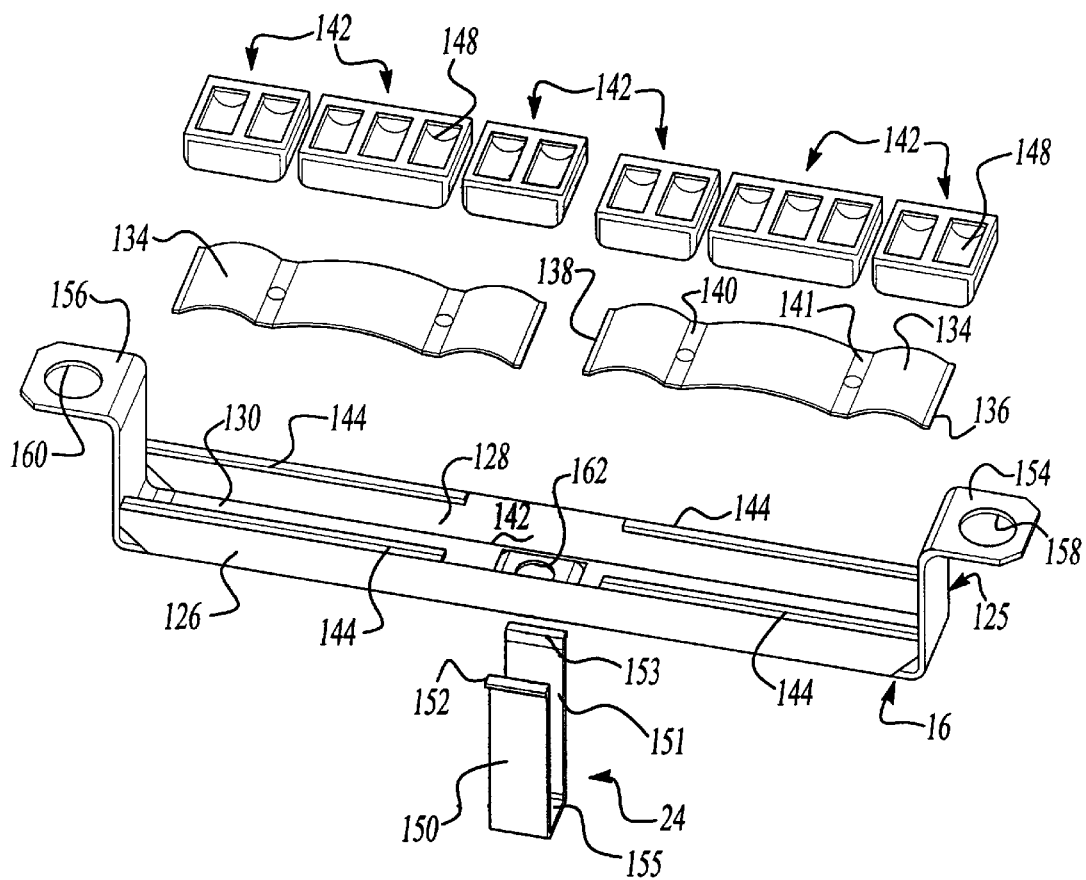
FIG. 6 is an exploded view of the second holder.

Turning now to FIGS. 5 and 6, the structural configuration and engagement of first holder 14, second holder 16, and retainer mechanism 20 will be described in detail. As shown in FIG. 5, first holder 14 includes a housing 25 preferably stamped from a stainless steel sheet. Housing 25 defines a "C" shaped channel 32 bounded on three sides by opposed side walls 26 and 28 and end wall 30.

Wave springs 34, also preferably formed of stainless steel, are disposable within channel 32 to engage end wall 30 at ends 36 and 38 as well as a center recess 40. Thermal and electric insulators 42 are also disposable within channel 32 to engage and capture springs 34 between end wall 30 and insulators 42. Those skilled in the art will appreciate that springs 34 urge insulators 42 away from end wall 30 and into engagement with stops 44 which extend inwardly into channel 32 from side walls 26 and 28. Insulators 42 include cavities 48 to accommodate and position heating element 18 therewithin. It is contemplated that insulators may be formed of a ceramic material known in the art to provide the desired thermal and electrical insulating properties.

First clip tabs 22 are illustrated in FIG. 5 to include a body 50 integral with one of side walls 26 and 28 and a catch 52 at the terminal end of body 50. Catches 52 extend inwardly toward channel 32 from body 50 as shown in FIG. 5. As will be described in detail below, catches 52 are configured and positioned for snap-fit engagement with outwardly extending catches formed on second tab 24.

Heater 10 includes a mounting assembly 17 (FIG. 2) cooperative with coupling assembly 15 for connecting the modular heater 10 to the manifold 12 of the internal combustion engine. More specifically, first holder 14 includes side flanges 54 and 56 having apertures 58 and 60 formed therein to accommodate bolt connections to manifold 12 as hereinafter described with reference to FIGS. 1 and 2. A similar flange and aperture configuration is provided in second holder 16 and heating element 18 as is described below.

As shown in FIG. 6, second holder 16 is configured substantially the same as first holder 14 with the exception of second tab 24. Accordingly, the components of second holder 16 are referred to herein by numerals increased by one hundred relative to the numbers used to describe first holder 14. For completeness, it is noted that springs 134 of second holder 16 include a pair of recesses 140 and 141 that engage end wall 130 of housing 125. Other than the configuration of springs 134 and the below described configuration of second tab 24, those skilled in the art will appreciate that the configuration and interrelation of side walls 126 and 128, channel 132, wave springs 134, insulators 142, stops 144, cavities 148, flanges 154 and 156, and apertures 158 and 160 are substantially the same as the corresponding components described above with reference to FIG. 5.

Second clip tab 24 is a stainless steel tab member shaped to generally conform to the configuration of housing 125 and includes opposed legs 150 and 151 extending upwardly from a bottom plate 155. The terminal end of each leg 150 and 151 includes an outwardly extending catch 152 and 153, respectively. Those skilled in the art will appreciate that the second clip tab 24 may be formed or stamped integral with housing 125 or connected thereto via a spot weld, rivet, bolt, or other connection known in the art such as at opening 162 in end wall 130.

To assemble modular heater 10, first holder 14 and second holder 16 are configured as shown in FIGS. 5 and 6, respectively, and heating element 18 is properly positioned relative to first holder 14 by seating within insulator cavities 48. A bolt 64, with appropriate insulators such as a washer 90 and sleeve 92, is disposed through apertures 80 and 66 and heating element 18 is seated in cavities 148 of second holder 16. An external force is then supplied to displace first holder 14 toward second holder 16 i.e., along the axis defined by arrow 68 (FIG. 3), thereby compressing wave springs 34 and 134. Legs 150 and 151 of second tab 24 are displaced toward one another to allow the catches 152 and 153 thereof to pass catches 52 of first clip tab 22. Legs 150 and 151 are then released and the forces of wave springs 34 and 134 are allowed to urge the respective catches into engagement.

Modular heater 10 may now be handled and/or shipped separately to an end user without additional assembly steps required. The shape of the catches 52, 152, and 153 allows movement of first holder 14 relative to second holder 16 in the direction of arrow 70 (FIG. 4) but restricts movement of the holders away from one another along the axis of arrow 68 (FIG. 3). This float provides the assembler an extra degree of freedom for alignment of apertures 58 and 60 with apertures 158 and 160 of second holder 16 or other features such as the mounting holes formed within intake manifold 12. It is preferred that bolts 86, with appropriate insulating sleeves 92 and washers 90, are positioned as shown in FIGS. 3 and 4 and hereinafter described so as to further simplify the later connection of heater 10 to manifold 12.

Those skilled in the art will appreciate that while the retainer mechanism 20 is illustrated and described herein as including first and second clip tabs 22 and 24, other coupling components generally known in the art may be used with the present invention. More particularly, it is contemplated that the retention function may be performed or supplemented through the use of straps or binders disposed about selected portions of the heater 10.

For completeness and in reference to FIG. 3, it should be noted that serpentine heater element 18 includes a center aperture 80 as well as end tabs 72 and 74 each with apertures 76 and 78, respectively. These tabs and apertures form part of the mounting structure of heater 10 which, in the preferred embodiment illustrated and described herein, cooperates with the bolt connectors of coupling assembly 15 as is most clearly illustrated in FIG. 2. Those skilled in the art will appreciate that heating element 18 is formed of an electrically resistant material that generates heat when connected to a power source as hereinafter described.

As best seen in FIGS. 1 and 2, modular heater 10 is connectable to intake manifold 12 through coupling assembly 15. Because the function of modular heater 10 is based on electrical resistance within heater element 18, coupling assembly 15 includes bolts 86, nuts 88 insulating washers 90 and sleeves 92 to avoid shorting the circuit. As shown in FIG. 2, each of bolts 86 is electrically connected to a power source 93 for communicating current to heating element 18. The bolt 86, nut 88, and heating element 18 are electrically isolated from manifold 12 and first and second holders 14 and 16, respectively, by the selective placement of insulating washers 90 and sleeve 92. Those skilled in the art will appreciate that a variety of insulators generally known in the art may be used in numerous configurations to properly isolate the current from potential sources of short circuiting. Bolt 64 is electrically connected to ground to complete the electric circuits through heating element 18. Those skilled in the art will appreciate that while a specific current configuration is illustrated in FIG. 2, the electrical connections between the heating element, power source, and ground may be modified without departing from the scope of the invention as defined by the appended claims. Those skilled in the art should also appreciate that a jumper bar 94 such as that illustrated in FIG. 1 may be used to simplify the ease of electrical connection of the heating element to the power source. Similarly, as shown in FIG. 7, the coupling components of modular heater 210 are insulated from manifold housing 212 by selective placement of insulating washers 290 and locking grommets 410.

It should be appreciated from the above description that the modular heater of the present invention does not negatively impact the integrity of the mechanical joint between intake manifold 12 and the engine due to additional gaskets, flanges, or heating elements that may shift, compress or wear over time. Secondly, an assembler installing modular heater 10 need not be concerned with handling or assembling multiple individual heater components. Rather, heater 10 can be secured to intake manifold 212 through the use of a threaded nut 88 with an appropriate insulating washer 90.

Figure 7:
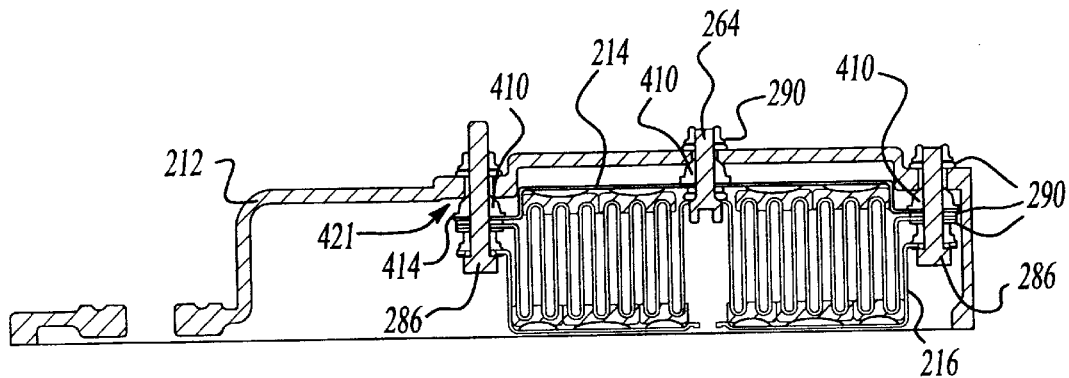
FIG. 7 is a sectional view similar to FIG. 2 illustrating a second embodiment of a heater device according to the present invention which is attached to an intake manifold.

FIG. 7 depicts a second embodiment of the modular heater device 210 attached to intake manifold 12. The function and components of this embodiment are generally the same as those previously described with reference to FIGS. 1–6. Accordingly, those skilled in the art will appreciate that modular heating device 210 provides the advantages discussed herein. For clarity, similar components are labeled with like numerals increased by 200.

Figure 8:
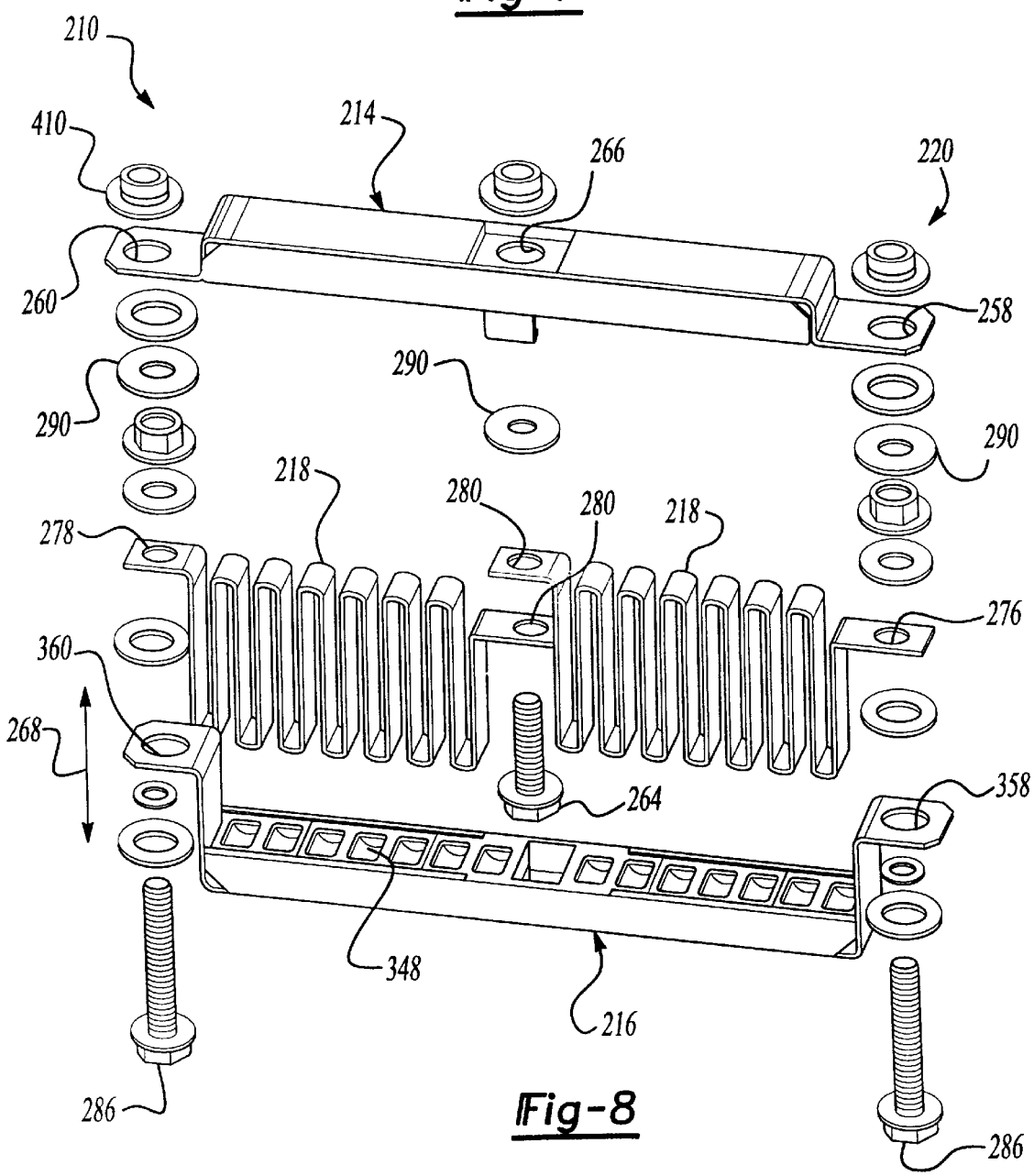
FIG. 8 is an exploded perspective view of the heater device shown in FIG. 7.
Figure 9:
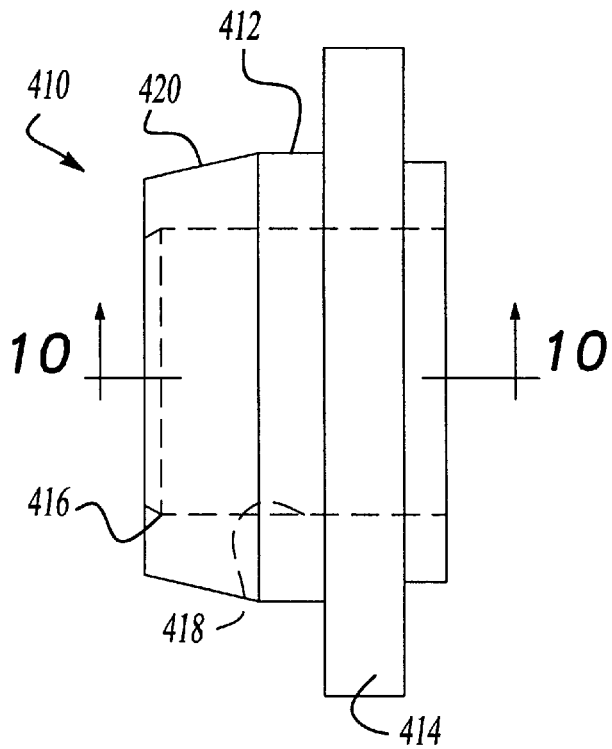
FIG. 9 is a elevational view of the locking grommet.
Figure 10:
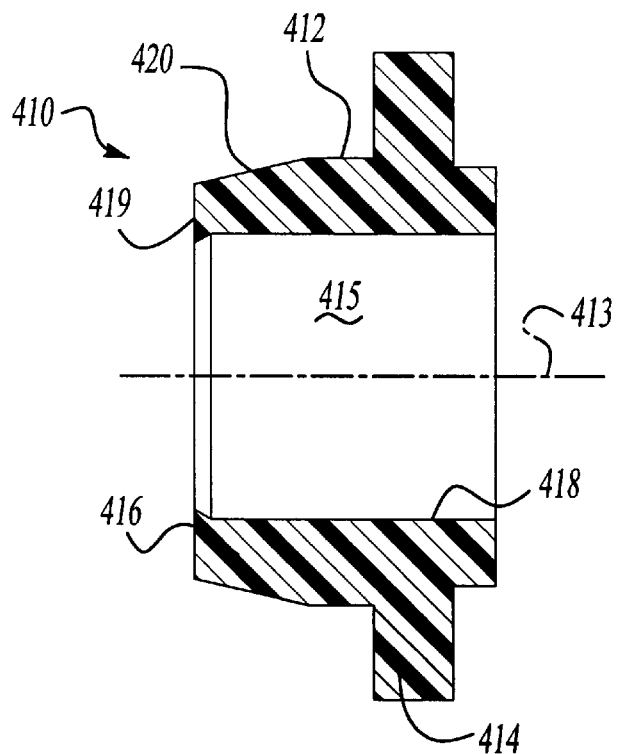
FIG. 10 is a sectional view of the locking grommet taken along the line 10—10 shown in FIG. 9.

As shown in FIG. 8, modular heater 210 includes a retainer mechanism 220 having three locking grommets 410 constructed from a resilient insulating material such as teflon. Locking grommets 410 are each configured to engage bolts 264 and 286 in a snap-fit coupling that retains heater element 218 between first and second holders 214 and 216. As shown in FIGS. 9 and 10, each locking grommet 410 includes a cylindrical sleeve 412 formed about a grommet axis 413 (FIG. 10) to form a passage 415, a flange 414 extending radially outward from sleeve 412, and a barb 416 circumscribing passage 415. It will be appreciated that passage 415 is sized to accommodate one of bolts 286 and 264 while barb 416 protrudes inwardly from an inner surface 418 of sleeve 412 proximate to a rear face 419 thereof to effectively reduce the size of passage 415 to a dimension less than the outer diameter of bolts 264 and 286.

Modular heater 210 is illustrated in its assembled state in FIG. 7. From this description and the appended drawings, it will be appreciated that the assembly of modular heater 210 is similar to that described above with reference to FIGS. 1–6. However, after positioning holders 214 and 216 relative to heating element 218 and arranging the various washers, nuts, and bolts as described, locking grommets 410 are positioned over bolts 264 and 286 and axially displaced along the bolts toward heating element 218 until flange 414 contacts first holder 214. As locking grommets 410 are displaced, barb 416 is compressed and/or urged radially outward allowing the barb to pass at least one thread of bolts 264 and 286. Once assembled, the wave springs urge holders 214 and 216 away from one another. This biasing force is resisted by the engagement of barb 416 with the thread of bolts 264 and 286. It should be appreciated that the term thread as used herein encompasses standard pitched threads as well as ribs or cylindrical grooves that may function to lockingly engage barb 416.

A chamfer 420 is provided along the exterior surface of sleeve 412 to facilitate positioning of locking grommet 410 within housing 212. As shown in FIG. 7, sleeve 412 is sized such that it will engage housing 212. Accordingly, upon connection of modular heater 210 to housing 212, the resiliency of locking grommet 410 allows the grommet to compress during assembly to form a non-conductive seal area 421 between heater 210 and housing 212.

The foregoing discussion discloses and describes two exemplary embodiments of the present invention. One skilled in the art will readily recognize from this discussion, and from the accompanying drawings and claims, that various changes, modifications and variations can be made therein without departing from the spirit and scope of the invention as defined in the following claims.

What is claimed is:

1. A heating device for use in an internal combustion engine comprising:

a first holder having a first aperture;

a second holder having a second aperture;

a heating element positioned between said first and second holders;

biasing means for urging one of said first holder and said second holder away from the other of said first holder and said second holder; and a retainer mechanism coupling the first holder to the second holder against the urging of said biasing means and to retain the heating element between said first and second holders, said retainer mechanism including a fastener disposed within said first and second apertures and a locking grommet engaging said fastener in a snap-fit coupling.

2. The heating device of claim 1 wherein the retainer mechanism includes a first clip coupled to the first holder and a second clip coupled to the second holder, said first clip engaging said second clip to couple the first holder to the second holder against the urging of the biasing means.

3. The heating device of claim 2 wherein the first clip includes a body and a catch projecting inwardly from the body, wherein the second clip includes a second body and a catch projecting outwardly from the second body, and wherein the catch of the first holder engages the catch of the second holder to couple the first holder to the second holder against the urging of the biasing means.

4. The heating device of claim 3 wherein said first clip is integral with said first holder.

5. The heating device of claim 1 wherein the first and second holders each contain an aperture for receiving a coupling mechanism adapted to couple the heating device to an engine.

6. The heating device of claim 1 wherein the biasing means creates a biasing force acting in a first direction and wherein the retainer mechanism allows movement of the first holder relative to the second holder in a second direction normal to the first direction.

7. The heating device of claim 1 wherein said first holder includes a housing defining a channel and a stop, said heating device further including an insulator in said channel, said biasing means urging said insulator against said stop.

8. The heating device of claim 1 wherein said fastener is a bolt.

9. The heating device of claim 1 wherein the locking grommet includes a sleeve having an inner surface defining a passage, said locking grommet having a barb projecting inwardly from the inner surface of the sleeve, and wherein the fastener includes a thread, said fastener disposed in said passage such that the barb of the locking grommet engages the thread of the fastener to couple the first holder to the second holder.

10. The heating device of claim 9 wherein the locking grommet is constructed from a resilient insulating material.

11. An internal combustion engine for use in a vehicle comprising:

an intake defining a passageway; and a modular heating device coupled to the intake in heat transfer relationship with the passageway, said modular heating device including a first holder having a first aperture, a second holder having a second aperture, a heating element positioned between the first and second holders, biasing means for urging one of said first holder and said second holder away from the other of said first holder and said second holder, and a retainer mechanism coupling the first holder to the second holder against the urging of the biasing means and to retain the heating element therebetween, said retainer mechanism including a fastener disposed within said first and second apertures and a locking grommet sealingly engaging said fastener and said intake.

12. The engine of claim 11 further including a connecting mechanism for removably coupling the heating device to the intake.

13. The engine of claim 11 wherein said retainer mechanism includes a first clip coupled to said first holder and a second clip coupled to the second holder, said first clip engaging said second clip to couple the first holder to the second holder against the urging of the biasing means.

14. The engine of claim 12 wherein the locking grommet includes a sleeve having an inner surface defining a passage, said locking grommet having a barb projecting inwardly from the inner surface of the sleeve, wherein the fastener includes a thread, said fastener disposed in said passage such that the barb of the locking grommet engages the thread of the fastener to couple the first holder to the second holder.

15. The engine of claim 14 wherein said locking grommet engages said intake to form an insulating seal therebetween.

16. A method for constructing a modular air intake heater comprising the steps of:

obtaining a first holder having a first aperture, a second holder having a second aperture, a spring, a locking grommet having a sleeve and a heating element;

positioning said heating element and said spring between said first and second holders;

displacing one of said first holder and said second holder toward the other of said first holder and second holder against the urging of said spring; and axially disposing a fastener within said first aperture, said second aperture and said sleeve to interconnect said first holder and said second holder, said fastener adapted to be secured without necessity of rotation.

17. The method of claim 16 further including a clip mechanism having a first tab coupled to said first holder and a second tab coupled to said second holder and wherein the step of coupling said first holder to said second holder includes placing said first tab in engagement with said second tab.

18. The method of claim 16 wherein said first holder and said second holder each include an aperture, wherein said fastener includes a threaded bolt and said locking grommet defines a passage having a barb projecting inwardly into said passage, and wherein the step of axially disposing said fastener within said sleeve includes displacing said bolt within the grommet passage such that said barb engages said bolt.

19. A heating device for use in an internal combustion engine comprising:

a first holder having a passage;

a second holder having a passage;

a heating element positioned between said first and second holders; and a retainer mechanism coupling said first holder and said second holder and retaining said heating element therebetween, said retainer mechanism including a bolt disposed in said passages of said first and second holders and a locking grommet engaging said bolt in a snap-fit coupling.

20. The heating device of claim 19 further including biasing means for urging one of said first holder and said second holder away from the other of said first holder and said second holder.

21. The heating device of claim 19 wherein said retainer mechanism is adapted to removably couple the heating device to an engine.

22. The heating device of claim 19 wherein said first holder includes a housing defining a channel and a stop, said heating device further including an insulator in said channel, said biasing means urging said insulator against said stop.

23. The heating device of claim 19 wherein the locking grommet includes a sleeve having an inner surface defining a sleeve passage, said locking grommet having a barb projecting inwardly from the inner surface of the sleeve, and wherein the bolt includes a thread, said bolt disposed in said passage such that the barb of the locking grommet engages the thread of the bolt to couple the first holder to the second holder.

* * * * *